Patented May 6, 1947

2,420,222

UNITED STATES PATENT OFFICE 2,420,222

METHOD OF PREPARING FLUORO-CHLORO COMPOUNDS

Anthony F. Benning, Woodstown, N. J., and Joseph D. Park, Wilmington, Del., assignors to Kinetic Chemicals, Inc., Wilmington, Del., a corporation of Delaware No Drawing. Application June 23, 1945, Serial No. 601,356

2 Claims. (Cl. 260—653)

This invention relates to the preparation of fluorochloro compounds and more particularly to the regeneration of monomeric and dimeric trifluoromonochloroethylene from polymeric trifluoromonochloroethylene.

Polymeric trifluoromonochloroethylene is a valuable material which is resistant to chemicals and various solvents. The monomeric trifluoromonochloroethylene is expensive. In the fabrication of structures from the polymer, scrap polymer is produced. Due to the chemical inertness of such polymer, the scrap has generally constituted waste material. Also, on long standing, the monomer tends to polymerize, which polymerization renders the material useless for many purposes. Our invention is particularly directed to a method for regenerating the monomer from waste polymer by pyrolysis.

Ordinarily, the pyrolysis of polymeric materials does not regenerate the monomer. This is particularly true with compounds containing chlorine. For example, in the pyrolysis of polymers of vinylidene chloride and chlorinated diphenyl, HCl is split out and compounds other than the monomer are obtained. It was, therefore, surprising that, upon the pyrolysis of polymeric trifluoromonochloroethylene, the regeneration of the monomer predominates.

It is an object of the present invention to produce fluoro-chloro compounds. Another object is to regenerate monomeric trifluoromonochloroethylene from polymeric trifluoromonochloroethylene by pyrolysis. Still another object is to provide a method for preparing dichloro hexafluorocyclobutane. A further object is to provide a method of recovering valuable products from waste polymeric trifluoromonochloroethylene. Other objects are to advance the art. Still other objects will appear hereinafter.

The above and other objects may be accomplished in accordance with our invention by heating polymeric trifluoromonochloroethylene at a temperature between 400° C. and 700° C. in the substantial absence of reactive substances for a sufficient period of time to convert the major proportion of the polymer to a monomeric trifluoromonochloroethylene and then promptly cooling the products. We have found that polymeric trifluoromonochloroethylene, which melts at above 300° C., will decompose at temperatures between 400° C. and 700° C. to produce products which range from gases to semi-solids at ordinary temperatures, e. g. 25 to 30° C., with the monomeric trifluoromonochloroethylene predominating and with the production of some of the dimer, dichloro hexafluorocyclobutane. We have, therefore, discovered a process for obtaining valuable compounds from materials which were heretofore considered to be useless and waste products.

The polymeric trifluoromonochloroethylene begins to decompose at about 400° C. and such decomposition proceeds more rapidly with an increase in temperature. Temperatures above 700° C. may result in further decomposition of the desired products and hence will be undesirable. Generally, the decomposition proceeds at a satisfactory rate at temperatures of from about 450° C. to about 475° C. and higher temperatures would usually be unnecessary.

The pyrolysis will be carried out preferably in a closed system in an apparatus made of material which is substantially inert to the polymer and to the reaction products. Suitable materials are platinum, carbon, Inconel and the like.

The pyrolysis should be carried out in the substantial absence of reactive substances, that is, substances which will react with the polymer or with the desired reaction products. The reaction may be carried out in the presence of inert gases, such as nitrogen, helium and the like. It will usually be preferred to carry out the pyrolysis in the presence of a stream of the inert gas, whereby the pyrolysis products are rapidly removed from the reaction zone. However, this is not necessary since the pyrolysis products are gaseous and will tend to escape quickly from the reaction zone.

The monomer produced tends to polymerize at high temperatures, but at a relatively slow rate in the vapor phase. In order to avoid such repolymerization, the pyrolysis products are removed from the reaction zone and cooled promptly.

The pyrolysis may be carried out at atmospheric pressures or preferably under reduced pressures. It may also be carried out continuously, intermittently or by batch methods.

The pyrolysis may also be carried out in the presence of heat transfer media in order to accelerate the reaction. Suitable heat transfer media are fluorspar, carbon and the like. These may be mixed with the polymer, as by grinding, prior to the pyrolysis.

The pyrolysis products may be separated by condensation and fractional distillation. They may also be separated as produced by fractional condensation.

In order to illustrate our invention and the preferred mode of carrying the same into effect, the following example is given:

Example

About 15 parts of sheet trifluoromonochloroethylene polymer was fed intermittently into a platinum-lined Inconel jacketed nickel tube 0.75" x 18" long at a rate of about 5 parts per hour. The temperature of the tube was gradually raised by means of electrical heating. By means of peep-holes, visual examination was made and sintering found to take place at about 400° C., with complete degradation at about 450–475° C. The major proportion of the pyrolysis was carried out at a wall temperature of about 460° C. These temperatures were measured by means of a thermocouple wrapped outside of the pyrolysis tube. The pyrolysis products were first passed through a trap for solids and the vapors condensed in a receiver cooled in carbon-ice acetone. This latter trap was backed by a receiver cooled in liquid nitrogen. There was little or no liquid condensate in the liquid nitrogen trap. About 11 parts of liquid was trapped in the carbon-ice acetone cooled receiver. Some semi-solid was also observed condensed on the walls. The liquid condensate was washed and dried and distilled. The first drop came over at about —37° C. and the boiling point rose rapidly to —30° C. to —29° C. This fraction was identified as $C_2F_3Cl$ by means of its boiling point and molecular weight. (Found 118; calc. for $C_2F_3Cl$, 116.5.) A fraction boiling over at —18° C. was unidentified. Still another fraction boiling at 58° C. to 60° C. and $n_D^{20}$ 1.333 was identified as the known dimer $(C_2F_3Cl)_2$, dichloro hexafluorocyclobutane, through its boiling point and refractive index. A fraction boiling higher than 60° C. in the residue was obtained but was not identified.

It will be understood that the preceding example is given for illustrative purposes solely and that various modifications and variations may be made therein and particularly in the conditions employed without departing from the spirit or scope of our invention. For example, the pyrolysis may also be carried out by passage of the finely divided polymer through a highly heated zone where contact with heated elements, such as hot grids, brings about almost instantaneous decomposition of the polymer to the monomer.

It will be apparent that by our invention, we have provided a means of salvaging waste polymeric trifluoromonochloroethylene and converting it by pyrolysis to the monomer and other useful products. This process, therefore, provides a new source for the valuable and generally expensive monomeric trifluoromonochloroethylene. It also provides a novel method of producing dichloro hexafluorocyclobutane. It was unexpected that the regeneration of the monomer would be the predominant thermal reaction.

We claim:

1. The process which comprises heating polymeric trifluoromonochloroethylene, having a melting point above 300° C., at a temperature between 400° C. and 700° C. in the substantial absence of reactive substances for a sufficient period of time to convert the major proportion of the polymer to monomeric trifluoromonochloroethylene and then promptly cooling the products, and separating monomeric trifluoromonochloroethylene from the products.

2. The process which comprises heating polymeric trifluoromonochloroethylene, having a melting point above 300° C., at a temperature of from about 450° C. to about 475° C. in the substantial absence of reactive substances for a sufficient period of time to convert the major proportion of the polymer to monomeric trifluoromonochloroethylene and then promptly cooling the products, and separating monomeric trifluoromonochloroethylene from the products.

ANTHONY F. BENNING.
JOSEPH D. PARK.

REFERENCES CITED

The following references are of record in the file of this patent:

UNITED STATES PATENTS

| Number | Name | Date |
| --- | --- | --- |
| 2,030,901 | Strain | Feb. 18, 1936 |
| 2,248,512 | Philip et al. | July 8, 1941 |